(12) United States Patent
Cook (10) Patent No.: US 7,506,036 B1
(45) Date of Patent: Mar. 17, 2009

(54) PROXY DEVICE AND METHOD OF OPERATION FOR A WINDOWING INTERNET PROTOCOL DATA NETWORK

(75) Inventor: Fred S. Cook, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1136 days.

(21) Appl. No.: 10/732,748

(22) Filed: Dec. 10, 2003

(51) Int. Cl.
*G06F 15/177* (2006.01)
(52) U.S. Cl. ...................................... 709/220; 714/100
(58) Field of Classification Search .................. 709/220, 709/221; 714/100
See application file for complete search history.

(56) References Cited

U.S. PATENT DOCUMENTS 6,298,422 B1 * 10/2001 Spilo et al. .................. 711/154

* cited by examiner

*Primary Examiner*—Frantz B Jean (57) ABSTRACT

A proxy device configured for use with a windowing Internet Protocol (IP) data network according to an embodiment of the invention includes a communication interface configured to intercept a first window of data packets transmitted from a source into the data network, transmit an acknowledgement from the proxy device to the source, and transmit the first window of data packets back into the network. The proxy device further includes a processing system configured to communicate with the communication interface, receive the first window of data packets, and generate the acknowledgement in response to the first window of data packets.

15 Claims, 9 Drawing Sheets

PROXY DEVICE AND METHOD OF OPERATION FOR A WINDOWING INTERNET PROTOCOL DATA NETWORK

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to a proxy device and method of operation for a data network, and in particular to a proxy device and method of operation for a windowing Internet Protocol (IP) data network.

2. Description of the Prior Art

The popularity of data networks has been made possible through communication protocols that allow computer devices to communicate regardless of the type of device and regardless of the type of communication medium. For example, many computers are networked together using the TCP/IP communication protocol that sends data as discrete packets.

Windowing protocols are one transmission scheme that is widely used to guarantee error-free delivery of data packets. Windowing protocols dictate that an acknowledgement be returned from the destination to the source when a "window" of packets are received at the destination. This avoids sending an acknowledgement for each received data packet. Windowing protocols dictate that, at a minimum, the transmitter must receive one acknowledgment during the course of a transmitted window—a well matched window would never reach the maximum window size (that would mean that the transmission must stop and wait for some time period). Windowing therefore operates by sending up to a predetermined number of packets before having to wait for an acknowledgement of error-free delivery. The window size is the number of data packets that can be sent before an acknowledgement is required. Windowing protocols provide a reliable mechanism for detecting and correcting lost and/or damaged data packets. The windowing therefore is used to guarantee delivery of data packets in an error-free fashion between transmission endpoints. Several windowing protocol variants exist, but they all have the same general advantage that they do not have to wait for the acknowledgment of each transmitted unit before sending the next and, likewise, they all suffer from the fact that they must stop and wait when the "window" is in use. In addition, windowing protocols come with a cost in the form of an end-to-end latency in the transmission of a window of packets.

For example, if a protocol has a window size of 4, the transmitting side may fill 4 unit "buffers" (memory storage locations) with data to transmit and begin sending them without consideration of the receiver. If the transmitting side manages to send all 4 unit buffers before the receiver acknowledges receiving any of the 4, then the transmitting side must stop and wait. If any of the transmitting buffers have been acknowledged prior to the transmitter completing the transmission of all 4 unit buffers, the transmitting side may reuse the acknowledged unit buffer by overwriting it with new data to transmit—thus managing to continue transmitting at full rate.

Windowing protocols (such as the Sockets protocol) were designed when most people only had narrow-band access, such as over an analog telephone line. These windowing protocols, while popular and reliable, are frequently unable to use all of the available bandwidth because of a combination of window size limitations, transmission latency, and transmission error rates. For example, the Sockets windowing protocol is generally limited to a data transmission rate of between 250 to 300 kilobytes-per-second (kbps) under normal network conditions, regardless of the available connection capacity.

Certain circumstances are inherently difficult for windowing protocols. Situations where the link delay is very large, or where the transmission rate sufficiently exceeds the window size are very difficult for windowing protocols. For instance, in the previous example, if the link delay was large enough that 200 unit buffers could be transmitted before the receiving end received the first buffer of data, then the window size of 4 would mean that the link could not be more than 1% utilized (200 buffer time from transmitter to receiver and 200 buffer time on acknowledgment from receiver back to transmitter equals 400 buffer time taken for every 4 buffers transmitted). The situation is worse, of course, if the receiver takes a long time to decide to acknowledge the transmission.

Figure 1:
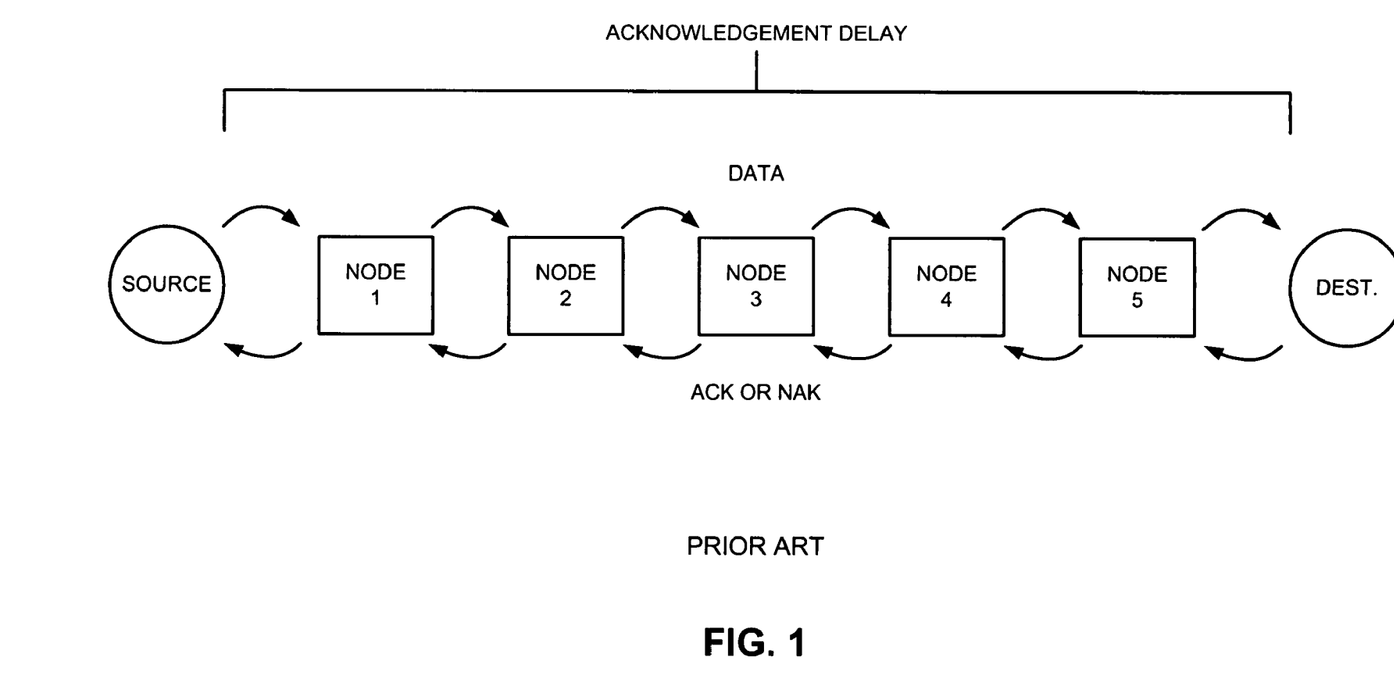
FIG. 1 shows a prior art windowing approach to data packet routing and transmission.

FIG. 1 shows a prior art windowing approach to data packet routing and transmission. In the prior art, a group of data packets (i.e., a "window" of data packets) is sent from the source to the destination in a group. The transmission will generally transit multiple nodes, in a chain of hops. In the example shown, each data packet of the window is routed from the source to node 1, from node 1 to node 2, from node 2 to node 3, from node 3 to node 4, etc., until all of the packets have been received in the destination. The number of intervening nodes will depend on the physical location of the source and destination, the data network carrier and carrier configuration, etc. The destination performs some manner of error checking on the received data packets, such as checking parity bits, Cyclic Redundancy Checking (CRC), checksumming, etc. The error checking can determine if any data is missing or corrupted. If the data transfer passes the error checking operation, the destination issues a positive acknowledgement (ACK) to the source, signaling acceptance of the received packet data. If one or more errors are detected, the destination issues a negative acknowledgement (NAK) that signals the source to re-transmit that data. The ACK/NAK travels back through the chain of nodes to the source. The end-to-end latency is the time required not only to transmit all of the data packets of the window to the source, but also includes the time required for the ACK/NAK to travel back to the source.

A drawback to the prior art windowing approach is that the source uses a transmit buffer to transmit the data and must wait for an ACK before reusing any of the transmit buffers. During a data transmission, the transmit buffer is repeatedly filled, the data is transmitted, the transmit buffer is re-filled, etc. However, the source holds the previously transmitted data in the transmit buffer until the ACK is received. The acknowledged transmit buffer data cannot be overwritten with new data in case a NAK is received and the current data must be retransmitted. Therefore, a delay is built into the buffering-windowing transmission scheme. In operation, the source must fill the transmit buffer, transmit the data, wait for an ACK, and then refill (and overwrite) the transmit buffer when the ACK is received. The prior art approach wait time for the ACK is therefore a built-in delay that adds to the transmission latency.

The acknowledgement component of the transmission delay in the prior art windowing approach was not appreciably noticeable when low-bandwidth access links were common. However, the increasing availability of high-bandwidth access has made the acknowledgement a large component of the end-to-end transmission delay. As a result, for large file transfers, the end-to-end acknowledgement delay has become significant and frustrating for users. This is especially true of file downloads from a network source to an end user (such as downloads from a file server or commercial access provider).

Several remedial approaches to the acknowledgement delay have been tried in the prior art. In one remedial approach, servers have been placed in the access networks. In this remedial approach, any re-requested data can be immediately provided to the destination without downloading that data from the source. By caching the downloaded data, access time is greatly improved. However, the caching approach is not an optimal solution. If the requested data is not currently cached or is not able to be cached, the acknowledgement delay is not avoided. In addition, the caching approach does not avoid the acknowledgement delay on the first download of a particular file, and only avoids the acknowledgement delay on subsequent requests for the particular file. Furthermore, the caching approach is expensive and may not be particularly effective in situations where data needs are unpredictable or where the data exceeds the size of the available cache memory.

Another prior art remedial approach has been to split a requested data into multiple data streams. Each data stream is separately transmitted to the destination, and therefore can be transferred substantially in parallel. However, this remedial approach also has its drawbacks. Although the acknowledgement delay for each data stream occurs substantially in parallel, the acknowledgement delay is not avoided and the end-to-end acknowledgement delay is not minimized or reduced. In addition, this prior art approach introduces additional complexity and potential for error in the re-combining of the data streams at the destination. Furthermore, both the source and the destination must have special software to perform the splitting and re-combining.

Yet another prior art remedial approach has been to use a larger transmit buffer and a corresponding larger packet size. This approach attempts to push more data through a larger pipe, and the larger packet size reduces the number of acknowledgements needed for a given file size. However, standard windowing approaches typically do not allow packet size to be increased beyond certain limits, and the maximum transmit buffer size is generally determined by the manufacturer. Intermediate nodes must agree to allowing the larger packet sizes and there is significant motivation to not allow larger packets. The result is a practical limit on how much the packet size can be increased.

SUMMARY OF THE INVENTION

The invention helps solve the above problems. Advantageously, the invention reduces an acknowledgement delay of a data transmission in a data network by cutting the chain of acknowledgments and generating one or more intermediate acknowledgements in one or more proxy devices.

A proxy device configured for use with a windowing Internet Protocol (IP) data network according to an embodiment of the invention comprises a communication interface configured to intercept a first window of data packets transmitted from a source into the data network, transmit an acknowledgement from the proxy device to the source, and transmit the first window of data packets back into the network. The proxy device further comprises a processing system configured to communicate with the communication interface, receive the first window of data packets, and generate the acknowledgement in response to the first window of data packets.

A method of operating a proxy device in a windowing IP data network according to an embodiment of the invention comprises intercepting in the proxy device a first window of data packets transmitted from a source into the data network, generating an acknowledgement in the proxy device in response when data packets from the first window are received, transmitting the acknowledgement from the proxy device to the source, and transmitting the first window of data packets back into the data network.

A proxy network for a windowing IP data network according to an embodiment of the invention comprises a first proxy device configured to receive a first window of data packets transmitted from a source, transmit a first acknowledgement to the source in response, replace an original destination address of each data packet of the first window of data packets with a second proxy device address to create a first modified window of data packets, and transmit the first modified window of data packets to a second proxy device corresponding to the second proxy device address. The proxy network further comprises the second proxy device configured to receive the first modified window of data packets, transmit a second acknowledgement to the first proxy device in response, replace the second proxy device address with a third proxy device address to create a second modified window of data packets if the second modified window of data packets will be transmitted to a third proxy device or replace the second proxy device address with the original destination address to create the second modified window of data packets if the window of data packets will not be transmitted to the third proxy device, and transmit the second modified window of data packets.

A method of operating a proxy network in a windowing IP data network according to an embodiment of the invention comprises receiving from a source a first window of data packets in a first proxy device of the proxy network, transmitting a first acknowledgement to the source in response, replacing an original destination address of each data packet of the first window of data packets with a second proxy device address to create a first modified window of data packets, and transmitting the first modified window of data packets to a second proxy device corresponding to the second proxy device address. The method further comprises receiving the first modified window of data packets in the second proxy device, transmitting a second acknowledgement to the first proxy device in response, replacing the second proxy device address with a third proxy device address to create a second modified window of data packets if the second modified window of data packets will be transmitted to a third proxy device, replacing the second proxy device address with the original destination address to create the second modified window of data packets if the window of data packets will not be transmitted to the third proxy device, and transmitting the second modified window of data packets.

BRIEF DESCRIPTION OF THE DRAWINGS

The same reference number represents the same element on all drawings.

DETAILED DESCRIPTION OF THE PREFERRED EMBODIMENT

FIGS. 2-9 and the following descriptions depict specific embodiments to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will also appreciate that the features described below can be combined in various ways to form multiple variations of the invention. As a result, the invention is not limited to the specific embodiments described below, but only by the claims and their equivalents.

Figure 2:
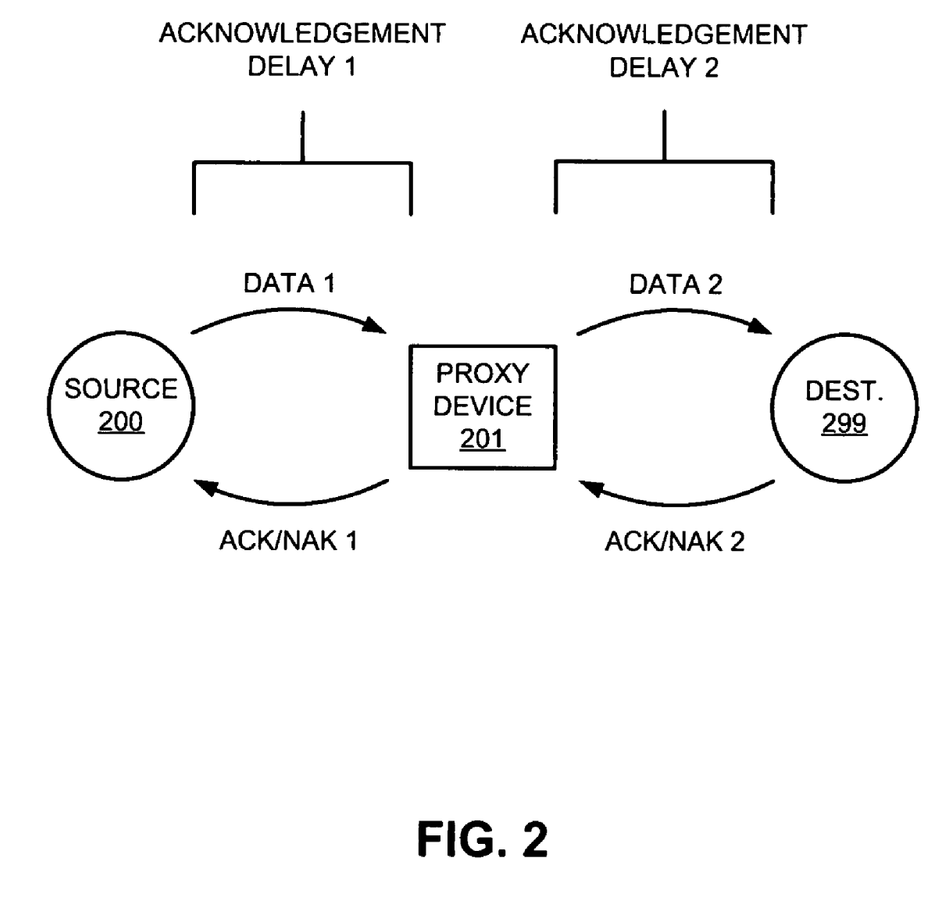
FIG. 2 is a block diagram that illustrates operation of a proxy device in a windowing Internet Protocol (IP) data network according to an embodiment of the invention.

FIG. 2 is a block diagram that illustrates operation of a proxy device 201 in a windowing Internet Protocol (IP) data network according to an embodiment of the invention. The proxy device 201 is configured to communicate, either directly or indirectly, with a source 200 and a destination 299. The original data (data 1) is transmitted from the source 200 and is intended for the destination 299. In one embodiment, the data 1 comprises a window of data packets, and the address of the destination 299 is included in each data packet. The window of data packets can include any number of data packets. Despite the destination address of the data packets, the proxy device 201 intercepts the window of data packets and accumulates the packets. The source 200 and the destination 299 may or may not be aware of the proxy device 201, and the data 1 does not need to be modified or customized for interception by the proxy device 201. When all packets of the window of data packets have been received in the proxy device 201, the proxy device acknowledges the window of data packets to the source 200 through a first acknowledgement (ACK 1) and then transmits the window of data packets on to the destination 299 (data 2). The second transmission (data 2) includes all of the same data as the first transmission (data 1), but is a new transmission of the window of data packets and is therefore acknowledged separately. In this manner, the acknowledgement delay is cut into at least two smaller delays, and the end-to-end transmission time is improved without increasing the error rate of the transmission. The operation of the proxy device 201 is discussed in more detail below, in conjunction with FIG. 3.

Figure 3:
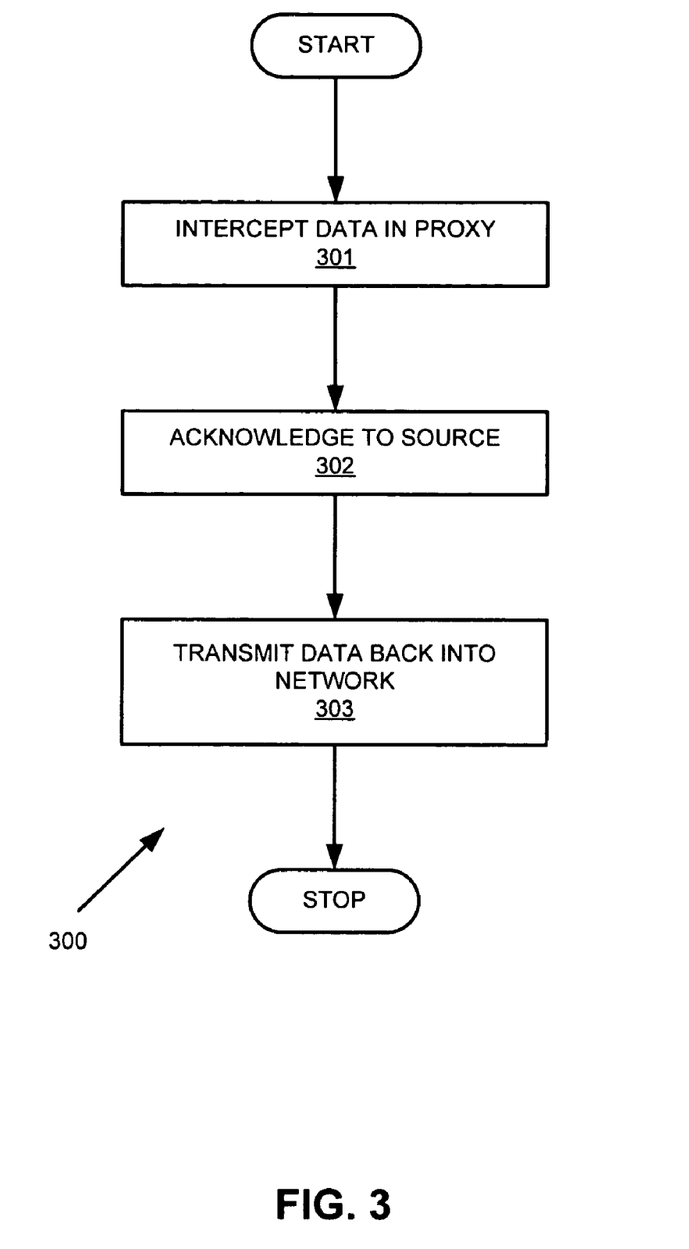
FIG. 3 is a flowchart of a method of operating a proxy device in a windowing IP data network according to another embodiment of the invention.

FIG. 3 is a flowchart 300 of a method of operating a proxy device in a windowing IP data network according to another embodiment of the invention. In step 301, the proxy device 201 intercepts data transmitted from the source 200 and intended for the destination 299. The proxy device 201 can intercept an entire window of data packets. The window of data packets can be accumulated in a storage system, such as a data buffer (see FIG. 4).

In step 302, the proxy device 201 sends an acknowledgment back to the source 200. The acknowledgment can be a positive acknowledgment (ACK) or a negative acknowledgment (NAK), and can follow an error checking procedure. The error checking can include a checksum, parity bits, performing a Cyclic Redundancy Check (CRC), etc. When the source 200 receives a positive acknowledgement, it is promptly freed up to transmit a next window of data packets. If a NAK is generated and set to the source 200, the source 200 must retransmit the window of data packets. A NAK can trigger a retransmission of the data, including a retransmission of specified data packets or a retransmission of the entire window of data packets.

The acknowledgement is sent before the entire transmission to the destination 299 has been completed. The acknowledgement at this point in time breaks the chain of acknowledgement delay. A second window of data packets can now be transmitted by the source 200. As a result, the invention effectively, simply, and efficiently reduces the end-to-end acknowledgement delay.

In step 303, the proxy device 201 transmits the window of data packets back into the data network and on to the destination 299. The transmission of this window of data packets is therefore complete, and the destination 299 sends an acknowledgement back to the proxy device 201.

Beneficially, in this embodiment, only a single proxy device 201 is needed in order to reduce the end-to-end acknowledgement delay. The single proxy device 201 only needs to intercept a window of data packets and send an acknowledgement back to the source 200 in order to cut the acknowledgement delay chain and reduce the acknowledgement delay. However, it should be understood that multiple proxy devices can be used, and each proxy device can be independent from and unaware of other proxy devices. For example, all routers, gateways, etc., of a particular data network can be configured to be proxy devices according to the invention.

In an additional benefit, the source 200 is less likely to receive a NAK, as the reduction in length of the data path from the source 200 to the proxy device 201 will make transmission errors less likely. A consequence of the invention is that transmission errors are divided between the transmission links created by any proxy devices. It should be understood that if an error occurs between the proxy device 201 and the destination 299, then a retransmission of data can occur between the destination 299 and the proxy device 201.

The reduction of the acknowledgement delay will be optimal when the proxy device 201 is situated so as to substantially halve the data path (or cut the acknowledgement delay into equal portions in the case of multiple proxy devices). It should be further understood that although only one proxy device 201 is required in order to reduce the end-to-end acknowledgement delay, multiple proxy devices 201 can be used and can be implemented to further reduce the acknowledgement delay.

Figure 4:
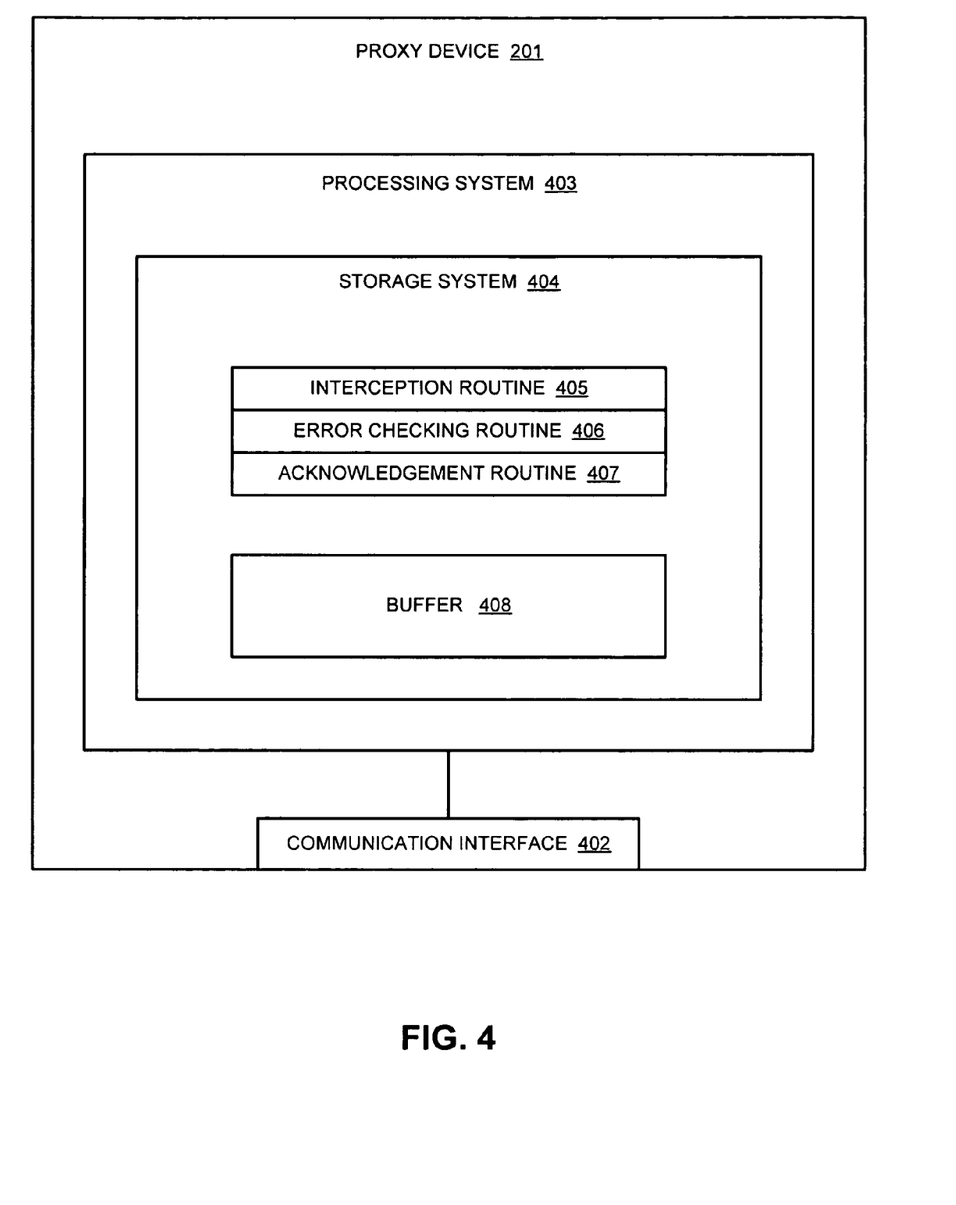
FIG. 4 is a block diagram of a proxy device according to yet another embodiment of the invention.

FIG. 4 is a block diagram of a proxy device 201 according to yet another embodiment of the invention. The proxy device 201 in this embodiment includes a communication interface 402 and a processing system 403, with the communication interface 402 being connected to the processing system 403. The processing system 403 can further include a storage system 404. The storage system 404 can comprise any manner of integral or independent electronic storage medium. The storage system 404 in one embodiment includes an interception routine 405, an error checking routine 406, an acknowledgement routine 407, and a buffer 408.

The communication interface 402 is configured to communicate with a windowing IP data network. The communication interface 402 is capable of transmitting and receiving data packets.

The processing system 403 conducts operations of the proxy device 201. The processing system 403 can comprise a general purpose computer, a microprocessing system, a logic circuit, or some other general purpose or customized processing device. The processing system 403 may be distributed among multiple processing devices.

The processing system 403 communicates with or accesses a data network via the communication interface 402. The processing system 403, when executing the interception routine 405, is configured to intercept a window of data packets transmitted from the source 200, acknowledge the window of data packets to the source 200, and transmit the window of data packets on to the destination 299.

The interception routine 405 is a software routine that configures the processing system 403 to receive data packets, accumulate the data packets in the buffer 408 until all data packets of a window of data packets are received, send an acknowledgement of the window of data packets to the source 200, and transmit the window of data packets on to the destination 299.

The error checking routine 406 performs any needed error checking on a received window of data packets and generates error information. As previously discussed, the error checking can include any type of error checking.

The acknowledgement routine 407 generates an acknowledgement. The acknowledgement routine 407 determines whether the acknowledgement should be positive or negative, based on the error information generated by the error checking routine 406. The acknowledgement routine 407 passes the acknowledgement to the interception routine 405 and the processing system 403.

The buffer 408 accumulates the data packets of the window of data packets. In one embodiment, the buffer 408 is a circular buffer, wherein pointers indicate where data is to be written into the buffer 408 and where data is to be read out of the buffer 408. The data packets are read and written under the direction of the processing system 403 when executing the interception routine 405.

In one embodiment, the proxy device 201 comprises a customized device that performs only a proxy operation. Alternatively, in another embodiment the proxy device hardware and proxy operation are incorporated into an existing component of a data network. For example, the proxy device 201 can comprise an Internet router, gateway, bridge, combination router/bridge, firewall, etc.

Figure 5:
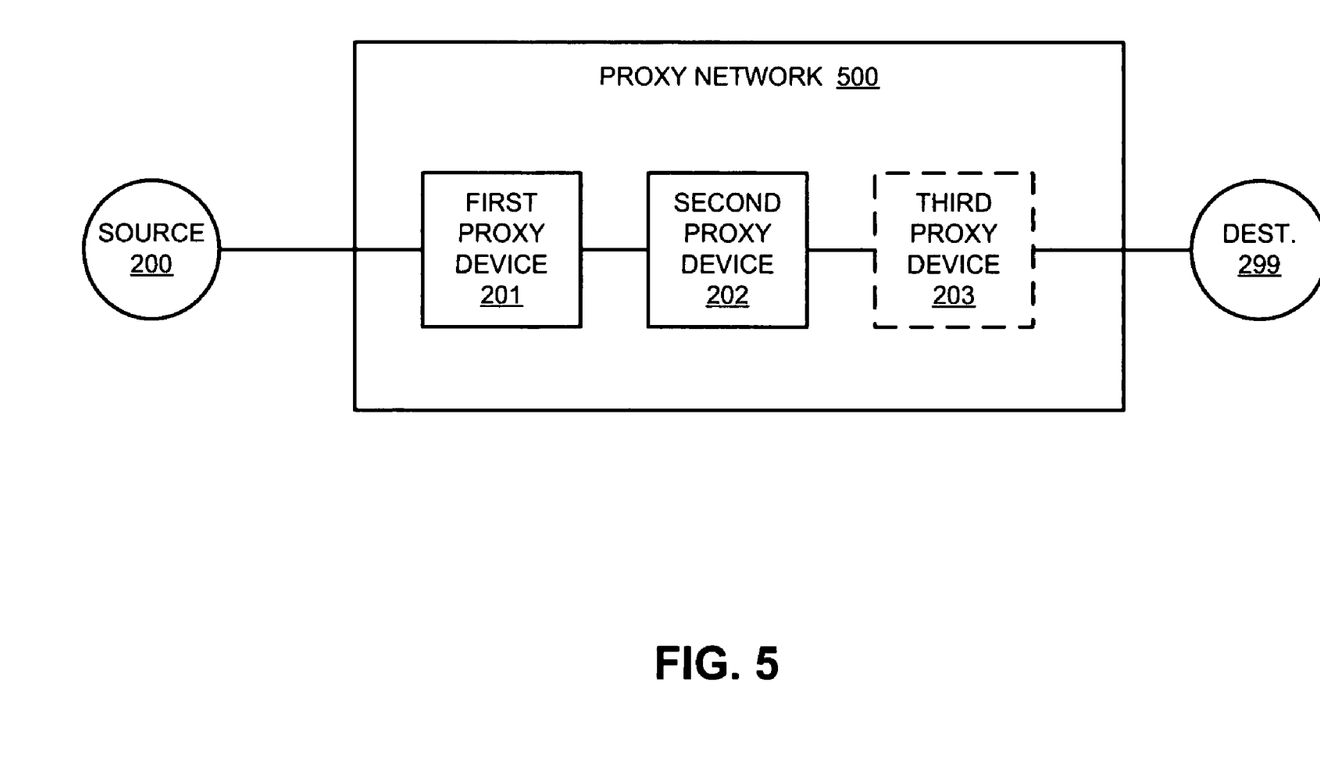
FIG. 5 is a block diagram of a proxy network according to yet another embodiment of the invention.

FIG. 5 is a block diagram of a proxy network 500 according to yet another embodiment of the invention. The proxy network 500 includes at least a first proxy device 201 and a second proxy device 202. In addition, the proxy network 500 can include additional proxy devices, such as the third proxy device 203.

As previously discussed, the proxy network 500 intercepts the window of data packets transmitted by the source 200. The first proxy device 201 inserts a proxy device address in each data packet of the window of data packets in place of the original destination address (i.e., the address of the destination 299). The original destination address in one embodiment is saved in each data packet, such as in the payload, for example, and can be recalled and/or used in any subsequent proxy devices. Alternatively, in other embodiments the original destination address can be otherwise communicated between proxy devices. The first proxy device 201 also acknowledges the reception of the window of data packets, as previously discussed. The acknowledgement delay is now significantly less than the acknowledgement delay of the prior art of FIG. 1. Because of this, the transmit buffer of the source 200 can be promptly refilled and the source 200 can transmit a next or subsequent window of data packets.

Meanwhile, the first proxy device 201 acts as a new source, and transmits the window of data packets to the second proxy device 202. The second transmission includes all of the same data as the first transmission, but is sent as a new window of packets and is therefore also acknowledged separately. The second proxy device 202 performs substantially the same operation as the first proxy device 201, and sends an acknowledgement to the first proxy device 201 when the window of data packets has been received. However, since in this example the second proxy device 202 is transmitting the window of data packets to the destination 299, the second proxy device 202 must change the destination address back to the original destination address (i.e., the address of the destination 299). When the transmission of the window of data packets has been completed, the destination 299 sends it's acknowledgement to the second proxy device 202.

In operation, instead of one long acknowledgement delay, the proxy network 500 creates multiple, shorter acknowledgement chains. Each acknowledgement delay is smaller than the overall acknowledgement delay of the prior art, and the source 200 only has to wait for the first acknowledgement delay before transmitting subsequent data. In this manner, the end-to-end acknowledgement delay is reduced to a fraction of the acknowledgment delay encountered in the prior art.

Figure 6:
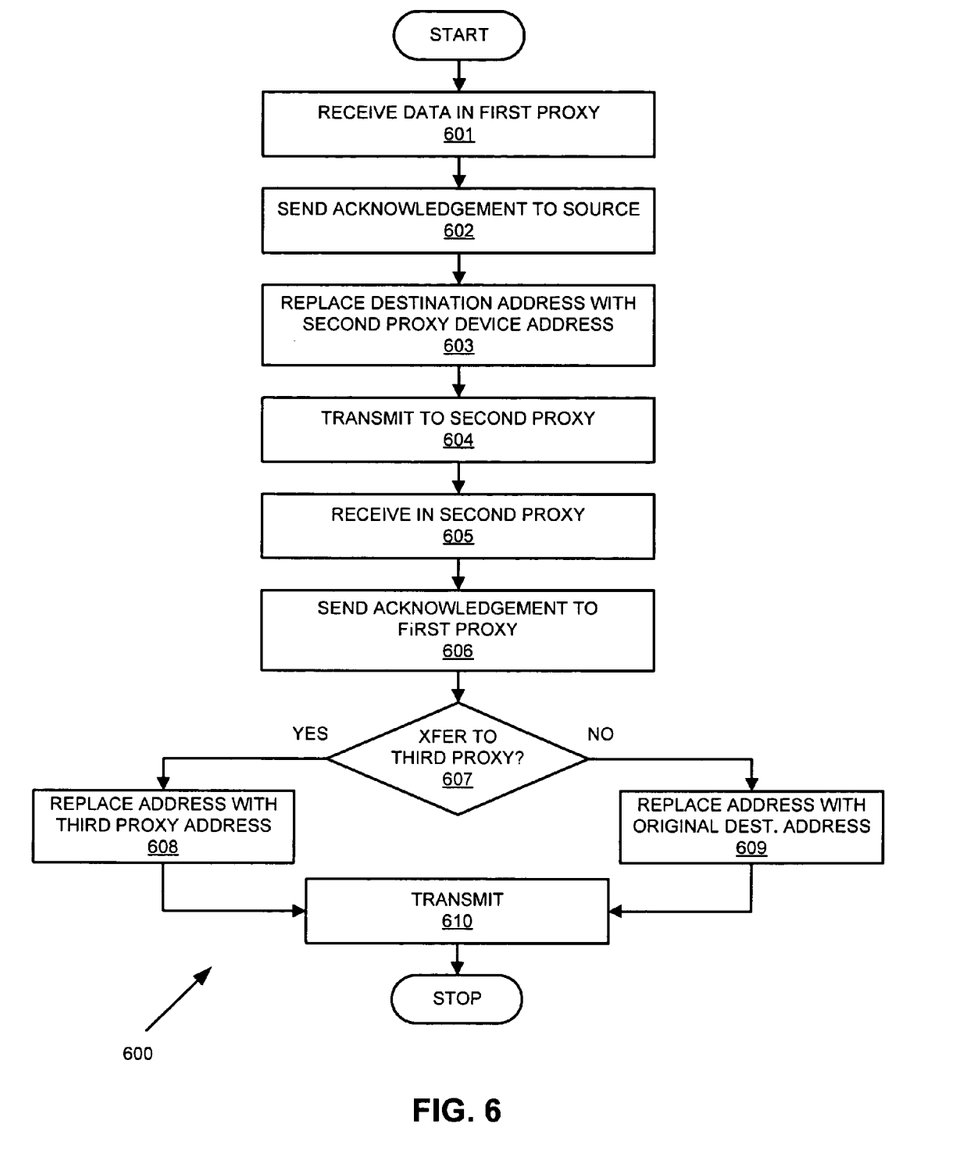
FIG. 6 is a flowchart of a method of operating a proxy network in a windowing IP data network according to yet another embodiment of the invention.

FIG. 6 is a flowchart 600 of a method of operating a proxy network in a windowing IP data network according to yet another embodiment of the invention. In step 601, a window of data packets is received in a first proxy device 201, as previously discussed. The first proxy device 201 is a first such proxy device encountered by the window of data packets in the proxy network 500 (the window of data packets may have passed through other nodes, such as routers, gateways, hubs, other data networks, etc.).

In step 602, the first proxy device 201 sends a first acknowledgement to the source 200, acknowledging the successful (ACK) or unsuccessful (NAK) receipt of the window of data packets. At this point, due to the acknowledgement, the source 200 is free to refill it's transmit buffer (if needed) and send a next window of data packets.

In step 603, the first proxy device 201 replaces the destination address in each data packet with a second proxy device address (i.e., with the address of the second proxy device 202 in this example). The first proxy device 201 therefore can modify the routing of the window of data packets, and can route the window of data packets to the second proxy device 202.

In step 604, the modified window of data packets is transmitted from the first proxy device 201 to the second proxy device 202.

In step 605, the modified window of data packets is received in the second proxy device 202.

In step 606, the second proxy device 202 sends a second acknowledgement to the first proxy device 201. The second acknowledgement is independent of the first acknowledgement (and is independent of any subsequent acknowledgements).

In step 607, the second proxy device 202 determines whether the window of data packets will be transferred to a third or subsequent proxy device (i.e., whether the window of data packets will be leaving or staying within the proxy network 500).

In step 608, the second proxy device 202 has determined that the window of data packets stay within the proxy network 500. Therefore, the second proxy device 202 replaces the current destination address (i.e., the address of the second proxy device) with an address of the third proxy device 203.

In step 609, the second proxy device 202 has determined that the window of data packets will leave the proxy network 500. This occurs where there are no additional proxy devices to be used or where the destination 299 is local to the second proxy device 202 and the second proxy device 202 delivers the window of data packets to the destination 299. Therefore, the second proxy device 202 replaces the current destination address with the original destination address, i.e., with the address of the destination 299.

In step 610, the window of data packets is transmitted to the node or device specified by the destination address, whether it be the third proxy device 203 or the destination 299. It should be understood that the window of data packets can pass through other nodes or devices on the way to the destination address, such as through routers, gateways, bridges, firewalls, other data networks, etc.

Figure 7:
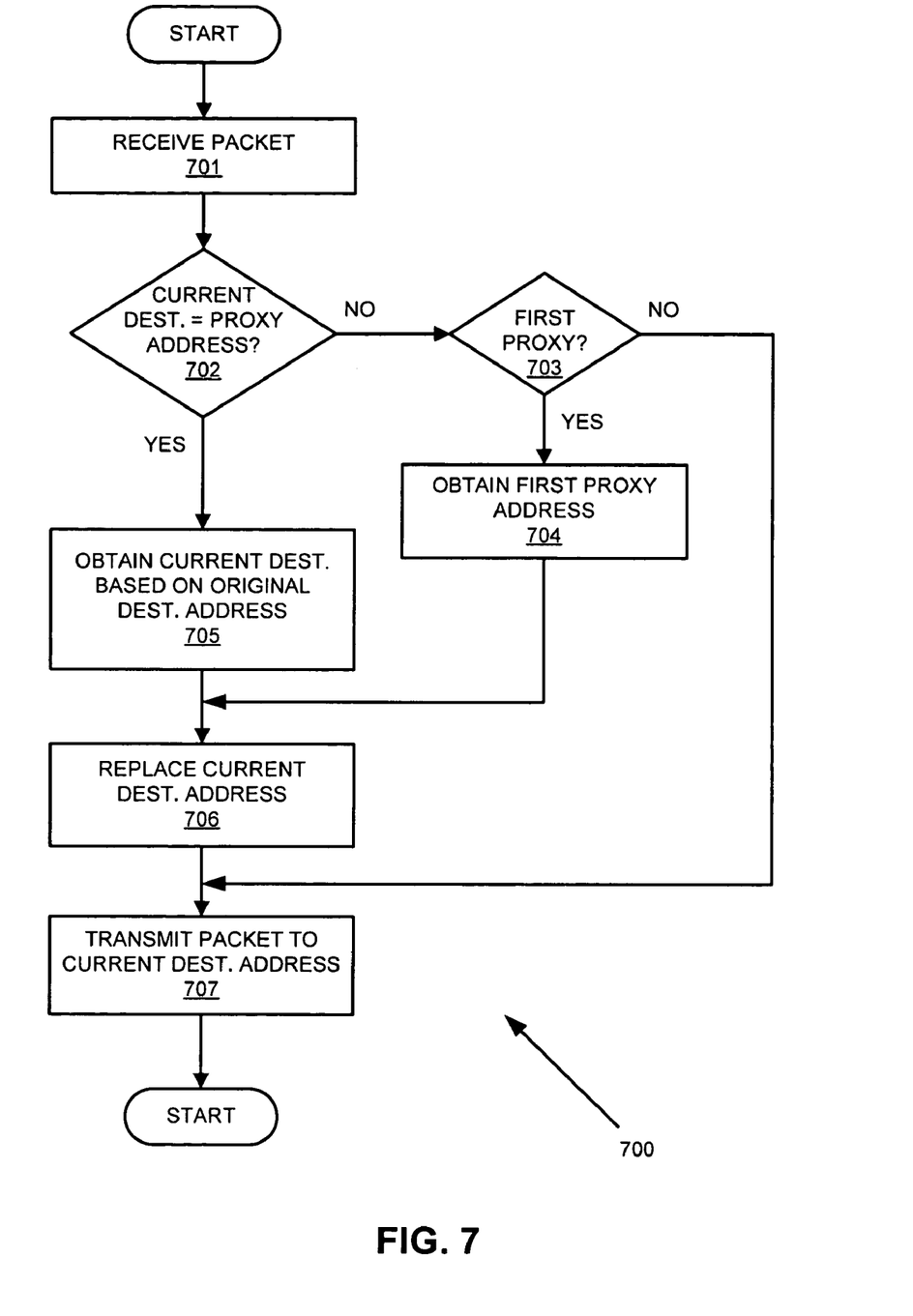
FIG. 7 is a flowchart of a method of operation of a particular proxy device of the proxy network, according to yet another embodiment of the invention.

FIG. 7 is a flowchart 700 of a method of operation of a particular proxy device of the proxy network 500, according to yet another embodiment of the invention. The method can apply to any proxy device encountered by the window of data packets when transmitted from the source 200 to the destination 299, including a single proxy device according to FIG. 2 or a proxy network according to FIG. 5. In step 701, the particular proxy device receives a window of data packets.

In step 702, the particular proxy device compares a current destination address of the data packets with the proxy address of the particular proxy device. This comparison is done in order to determine if the particular proxy device is a second or other subsequent proxy device encountered during the transmission. If the current address is a proxy device address, the method proceeds to step 705; otherwise it branches to step 703.

In step 703, the particular proxy device determines if it is a first encountered proxy device. This is accomplished in one embodiment by checking routing information, such as a routing table, wherein the particular proxy device is the first encountered proxy device if no other proxy devices are listed in the routing information. If the particular proxy device is the first encountered proxy device, the method proceeds to step 704. If the particular proxy device is not the first encountered proxy device, the method branches to step 707 and performs a normal routing operation on the window of data packets (i.e., if the incoming destination address is not a proxy device address and the particular proxy device is not the first encountered proxy device, then the particular proxy device must be outside of the proxy operation and no new proxy device address is inserted into the data packets of the window of data packets).

In step 704, the particular proxy device is the first encountered proxy device and the incoming destination address of a packet is therefore the address of the destination 299. As a result, the particular proxy device obtains a proxy address of a next proxy device. For example, if the particular proxy device is the first proxy device 201, it obtains the address of the second proxy device 202, such as through a routing table or other routing information.

In step 705, the particular proxy device is not a first proxy device and the particular proxy device obtains a next destination address based on the original destination address. The particular proxy device can obtain either an address of a next proxy device or the address of the destination 299 in this step. For example, if the particular proxy device is the second proxy device 202, the particular proxy device can obtain the address of the third proxy device 203. However, if the particular proxy device is the last proxy device in the routing path of the window of data packets (for example, if it is the third proxy device 203 as shown in FIG. 5), then the particular proxy device obtains the original destination address (i.e., the address of the destination 299). This occurs where either the destination 299 is local to the particular proxy device or where no further proxy devices are available in the routing path to the destination 299.

In step 706, the particular proxy device replaces the incoming destination address with the newly obtained next destination address, as determined in either step 704 or step 705. Each data packet in the window of data packets has its destination address replaced.

In step 707, the window of data packets is transmitted back into the data network and on to the next destination address. As previously described, the next destination address can be an address of a next proxy device or can be the address of the destination 299.

Figure 8:
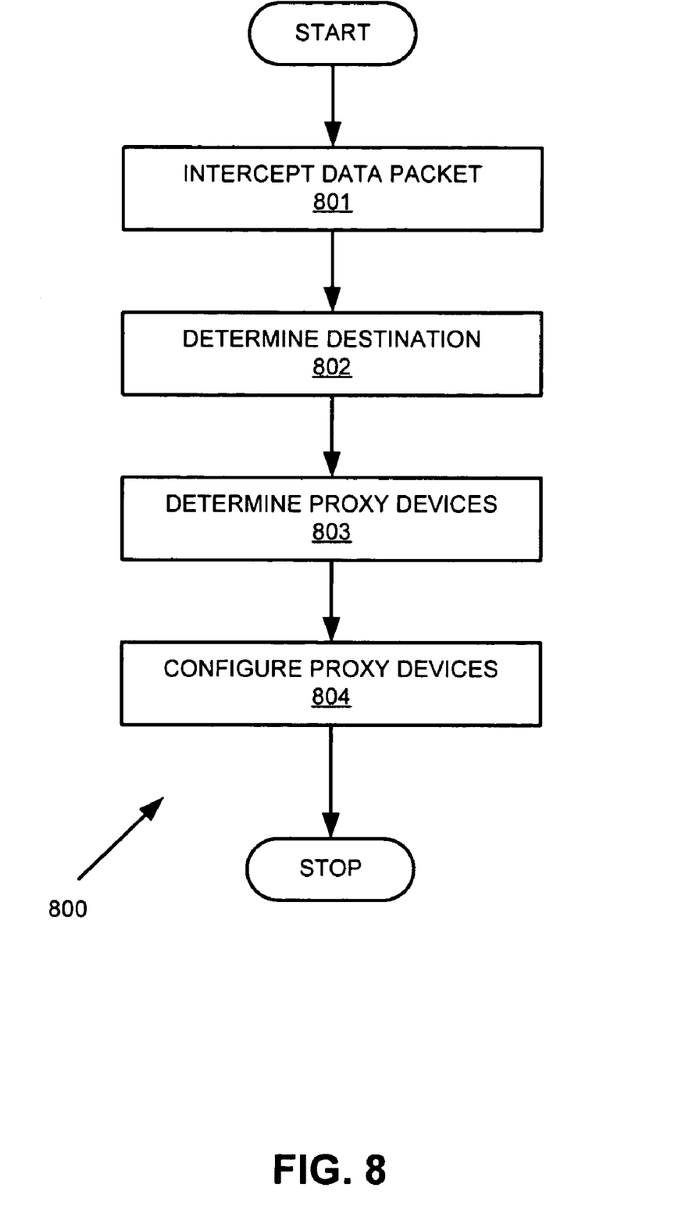
FIG. 8 is a flowchart of a method of operation of a particular proxy device of the proxy network, according to yet another embodiment of the invention.

FIG. 8 is a flowchart 800 of a method of operation of a particular proxy device of the proxy network 500, according to yet another embodiment of the invention. In this embodiment, the proxy devices that intercept and relay the window of data packets are selected and configured at the beginning of the transmission. In step 801, a proxy device intercepts a data packet. In one embodiment, the data packet is a first data packet of the window of data packets. In another embodiment, the data packet is a first data packet of the entire transmission, including all windows of data packets. The proxy device is therefore the first proxy device by default.

In step 802, the first proxy device determines the destination of the window of data packets. In one embodiment, the determination comprises reading the original destination address in the intercepted data packet. In another embodiment, some manner of address translation or lookup is performed as needed.

In step 803, the first proxy device determines a set of two or more proxy devices that will participate in the transmission (including the first proxy device). The first proxy device therefore determines a routing path and determines proxy devices that can be used to accomplish the routing path. The determination takes into account the number of transited nodes and can take into account the distance and spacing between proxy devices in order to optimize the data transmission. For example, in one embodiment the first proxy device selects proxy devices and the routing path so that each proxy device is substantially equidistant from other proxy devices (in terms of physical distance, transit time, number of intervening nodes, or combinations thereof). In this manner, the acknowledgement delay can be minimized by substantially balancing all data transmissions and acknowledgments.

In step 804, the first proxy device configures the set of two or more proxy devices for the upcoming data transmission. In one embodiment, this entails placing the original destination address and a next proxy address into a routing table or routing structure in each proxy device. The original destination address can be retained in each proxy device, in only the last proxy device, or can be saved in each data packet. The set of two or more proxy devices can now transmit all windows of data packets. In addition, the first proxy device can remove the original destination address from each data packet and replace it with a proxy device address of the next proxy device, and the last proxy device can re-insert the original destination address back into each packet so that the window of data packets is delivered to the destination 299. The configuration of the set of proxy devices can be undone or reversed when the data transmission has been completed.

This embodiment invention is well suited to a core data network provider, as this embodiment gives the provider the ability to transparently increase the effective throughput of windowing protocols (such as the Sockets windowing protocol, for example). However, in order to efficiently reduce end-to-end acknowledgement delays in this embodiment, the proxy device that originally intercepts the windowing protocol should be able to estimate the path latency and error rate to determine whether a proxy mechanism will be of benefit. In this embodiment, the intercepting proxy device must have some concept of the network topology in order to decide which other proxy device to use as an endpoint and determine any intervening proxy devices to be used in the routing path. This means that a number of mechanisms, such as group routing protocols and path designation mechanisms like MultiProtocol Label Switching (MPLS), may be used to implement the required capabilities.

Figure 9:
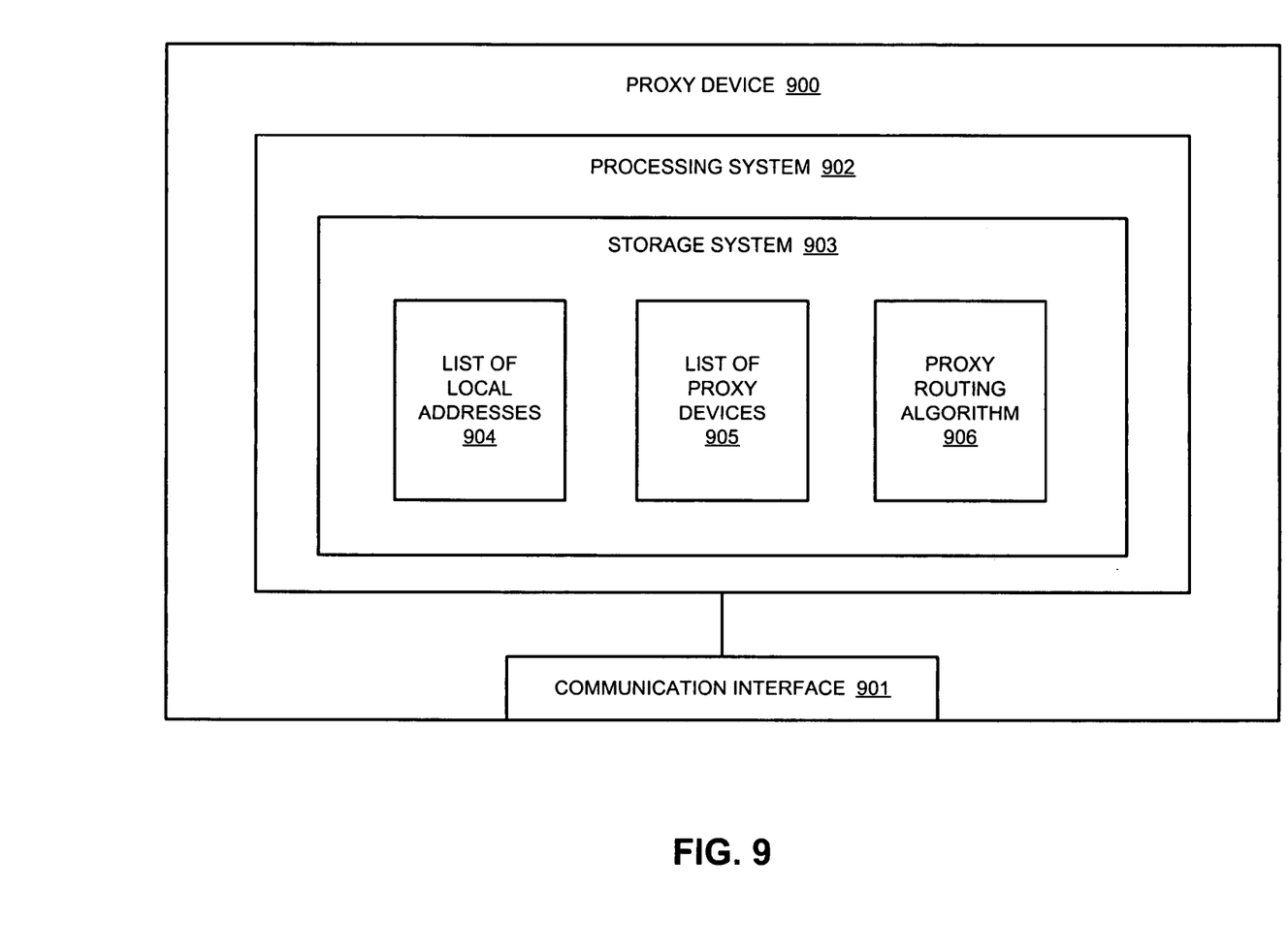
FIG. 9 is a block diagram of a proxy device of the proxy network according to yet another embodiment of the invention.

FIG. 9 is a block diagram of a proxy device 900 of the proxy network 500 according to yet another embodiment of the invention. The proxy device 900 can operate as a first, second, third, etc., proxy device during transmission of a window of data packets (see FIG. 5). The proxy device 900 can include a communication interface 901 and a processing system 902, as previously discussed (see FIG. 4 and accompanying discussion). The processing system 902 can include an integral or independent storage system 903, as previously discussed. The processing system 902 can include or access a list of local addresses 904, a list of proxy devices 905, and a proxy routing algorithm 906. In addition to the stored information and the software routine, the proxy device 900 can include the routines and buffer that are shown and discussed in FIG. 4 above.

The list of local addresses 904 stores network addresses that are local to the proxy device 900. The list of local addresses 904 can be used to route packets. In one embodiment, the processing system 902 compares an incoming destination address to the list of local addresses 904 to see if a window of packets should be send on to another router/network or whether it can be locally delivered. If the incoming destination address is matched in the list of local addresses 904, no further proxy device is needed for the transmission (i.e., the destination 299 is local to the proxy device 900).

The list of proxy devices 905 can include all proxy devices within the proxy network 500. The list of proxy devices 905 can be used to determine a next proxy device, if needed. The list of proxy devices 905 is accessed by the processing system 902 when a new window of data packets has been received, and can be used in conjunction with the list of local addresses 904 to determine if a next proxy device address should be obtained.

The proxy routing algorithm 906, when executed by the processing system 902, accesses the list of local addresses 904 and the list of proxy devices 905 in order to determine a next destination address. The proxy routing algorithm 906 obtains the next destination address and inserts the next destination address into the data packets of the window of data packets. The window of data packets is then transmitted to the next destination address.

A proxy device or proxy network according to the invention differs from the prior art in that the invention greatly reduces an acknowledgment delay for a window of data packets. The invention converts the transmission of windows of data packets (and corresponding acknowledgements) into multiple transactions between a source and a destination. The invention frees up the source to transmit a next window of data packets much sooner than in the prior art, and therefore significantly reduces the acknowledgement delay with a very minimal impact on the data network.

The invention advantageously reduces an end-to-end transmission delay for a window of data packets. The invention accomplishes this without requiring any changes to the source or destination devices. The invention is accomplished by minor changes to an intermediate device or devices in a data network.

The proxy device action is transparent to both senders and receivers. The data does not need to be modified, and the decrease in end-to-end transmission time is accomplished without any corresponding increase in error rate. The reduction in the end-to-end transmission time not only reduces transmission time for a particular data transmission, but it also increases throughput for all data transmissions.

What is claimed is:

1. A proxy network for a windowing Internet Protocol (IP) data network, comprising:

a first proxy device configured to receive a first window of data packets transmitted from a source, transmit a first acknowledgement to the source in response, replace an original destination address of each data packet of the first window of data packets with a second proxy device address to create a first modified window of data packets, and transmit the first modified window of data packets to a second proxy device corresponding to the second proxy device address;

wherein the first proxy device comprises a communication interface configured to communicate over the windowing Internet Protocol (IP) data network, receive a third window of data packets, transmit a third acknowledgement to the source, and transmit a third modified window of data packets;

wherein the first proxy device further comprises a processing system configured to communicate with the communication interface, create a third modified window of data packets by replacing a destination address of each data packet of the third window of data packets with a subsequent proxy device address if the third modified window of data packets will be transmitted to a subsequent proxy device or replacing the destination address with an original destination address if the third modified window of data packets will not be transmitted to the subsequent proxy device; and the second proxy device configured to receive the first modified window of data packets, transmit a second acknowledgement to the first proxy device in response, replace the second proxy device address with a third proxy device address to create a second modified window of data packets if the second modified window of data packets will be transmitted to a third proxy device or replace the second proxy device address with the original destination address to create the second modified window of data packets if the window of data packets will not be transmitted to the third proxy device, and transmit the second modified window of data packets.

2. The proxy network of claim 1, wherein the processing system accesses a proxy routing algorithm to determine whether to replace the destination address with the original destination address or the subsequent proxy device address.

3. The proxy network of claim 1, wherein the processing system accesses a proxy routing algorithm, a list of local addresses, and a list of proxy devices in order to determine whether to transmit the second modified window of data packets to the destination, wherein the second modified window of data packets is transmitted to the subsequent proxy device if the destination is not in the list of local addresses, with the subsequent proxy device being determined by the list of proxy devices.

4. The proxy network of claim 1, with a particular proxy device of the proxy network being configured to intercept a first data packet of the window of data packets, determine a destination of the first data packet and a corresponding routing path, determine a set of two or more proxy devices to be included in the routing path, and program the set of two or more proxy devices to relay data packets of the window of data packets forward to the destination and relay acknowledgements back to previous proxy devices and to the source.

5. A proxy network for a windowing Internet Protocol (IP) data network, comprising:
   a first proxy device configured to receive a first window of data packets transmitted from a source, transmit a first acknowledgement to the source in response, replace an original destination address of each data packet of the first window of data packets with a second proxy device address to create a first modified window of data packets, and transmit the first modified window of data packets to a second proxy device corresponding to the second proxy device address;
   the second proxy device configured to receive the first modified window of data packets, transmit a second acknowledgement to the first proxy device in response, replace the second proxy device address with a third proxy device address to create a second modified window of data packets if the second modified window of data packets will be transmitted to a third proxy device or replace the second proxy device address with the original destination address to create the second modified window of data packets if the window of data packets will not be transmitted to the third proxy device, and transmit the second modified window of data packets; and
   wherein the first proxy device and the second proxy device are
   further configured to receive a data packet in the particular proxy device as part of a data transfer, with said data packet including a source address and an incoming destination address, determine whether the incoming destination address matches a proxy device address of the particular proxy device, obtain a first proxy address as a proxy destination address if the incoming destination address matches the proxy device address and if the particular proxy device is a first proxy device of the data transfer, obtain a new proxy address as the proxy destination address using the incoming destination address if the incoming destination address matches the proxy device address, and replace the incoming destination address in the data packet with the proxy destination address if the incoming destination address matches the proxy device address or if the particular proxy device is the first proxy device.

6. A method of operating a proxy network in a windowing Internet Protocol (IP) data network, with the method comprising:
   receiving from a source a first window of data packets in a first proxy device of the proxy network;
   buffering the first window of data packets;
   performing a first error checking operation on the first window of data packets;
   transmitting a first acknowledgement to the source in response, wherein the first acknowledgement is a positive acknowledgement if the first error checking operation does not detect any errors in the first window of data packets and wherein the first acknowledgement is a negative acknowledgement if the first error checking routine does detect errors in the first window of data packets;
   replacing an original destination address of each data packet of the first window of data packets with a second proxy device address to create a first modified window of data packets;
   transmitting the first modified window of data packets to a second proxy device corresponding to the second proxy device address;
   receiving the first modified window of data packets in the second proxy device;
   buffering the first modified window of data packets;
   performing a second error checking operation on the first modified window of data packets;
   transmitting a second acknowledgement to the first proxy device in response, wherein the second acknowledgement is a positive acknowledgement if the second error checking operation does not detect any errors in the first modified window of data packets and wherein the second acknowledgement is a negative acknowledgement if the second error checking routine does detect errors in the first modified window of data packets;
   replacing the second proxy device address with a third proxy device address to create a second modified window of data packets if the second modified window of data packets will be transmitted to a third proxy device;
   replacing the second proxy device address with the original destination address to create the second modified window of data packets if the window of data packets will not be transmitted to the third proxy device; and
   transmitting the second modified window of data packets.

7. The method of claim 6, further comprising receiving a second window of data packets from the source in response to the first acknowledgement.

8. The method of claim 6, wherein if the first acknowledgement is a positive acknowledgement, the first acknowledgement initiates transmission of a second window of data packets by the source.

9. The method of claim 6, wherein if the first acknowledgement is a negative acknowledgement, the first acknowledgement initiates retransmission of the first window of data packets by the source.

10. The method of claim 6, further comprising receiving a third acknowledgement in the proxy device in response to transmitting the second modified window of data packets.

11. The method of claim 6, wherein the first and second acknowledgements comprise positive acknowledgements.

12. The method of claim 6, with the transmitting the second modified window of data packets comprising transmitting the second modified window of data packets to the destination.

13. The method of claim 6, with the transmitting the second modified window of data packets comprising transmitting the second modified window of data packets to a third proxy device.

14. The method of claim 6, with operation of a particular proxy device of the proxy network comprising:
   receiving a data packet in the particular proxy device as part of a data transfer, with said data packet including a source address and an incoming destination address;
   determining whether the incoming destination address matches a proxy device address of the particular proxy device;

obtaining a first proxy address as a proxy destination address if the incoming destination address matches the proxy device address and if the particular proxy device is a first proxy device of the data transfer;

obtaining a new proxy address as the proxy destination address using the incoming destination address if the incoming destination address matches the proxy device address; and replacing the incoming destination address in the data packet with the proxy destination address if the incoming destination address matches the proxy device address or if the particular proxy device is the first proxy device.

15. The method of claim 6, with operation of a particular proxy device of the proxy network further comprising:

intercepting a first data packet of the window of data packets;

determining a destination of the first data packet and a corresponding routing path;

determining a set of two or more proxy devices to be included in the routing path; and programming the set of two or more proxy devices to relay data packets of the window of data packets forward to the destination and relay acknowledgements back to previous proxy devices and to the source;

wherein the data packets of the window of data packets are relayed through the set of proxy devices before the data packets reach the destination.

* * * * *